April 22, 1941.    C. P. WEBER    2,239,307
REPAIR CLAMP FOR BELL AND SPIGOT JOINTS Filed May 9, 1939    3 Sheets—Sheet 1

Clifford P. Weber INVENTOR
BY Louis Prevost Whitaker
ATTORNEY

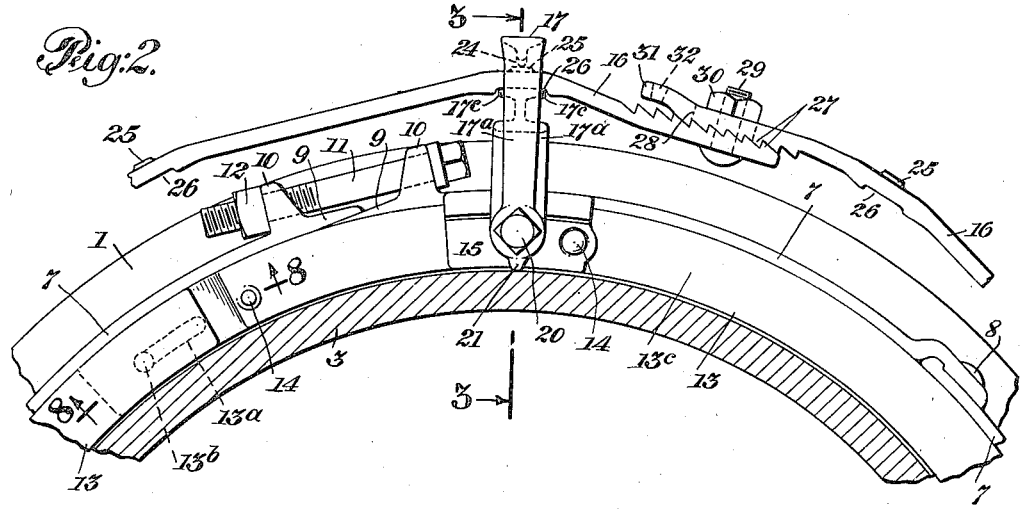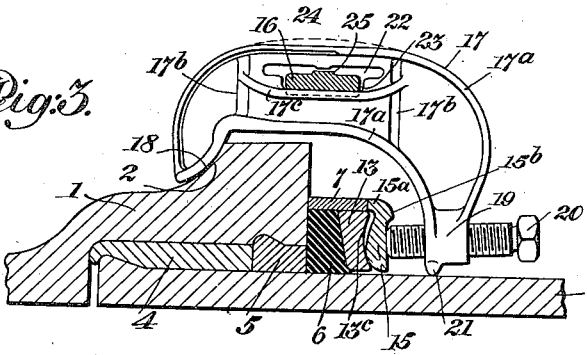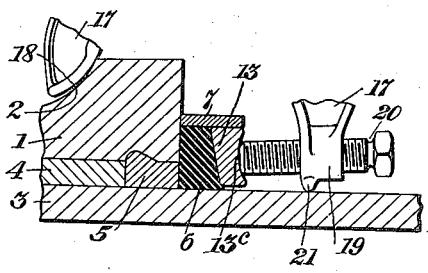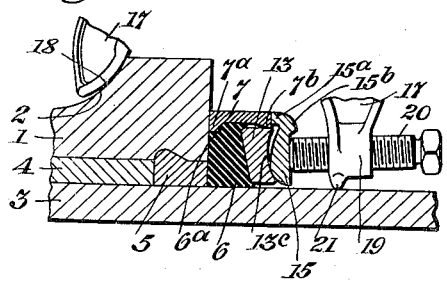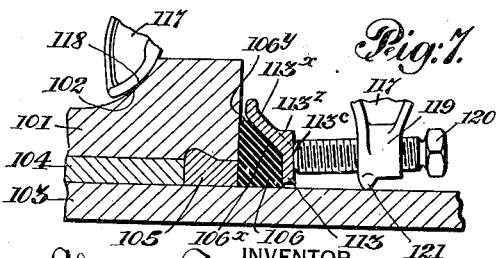

April 22, 1941.  C. P. WEBER  2,239,307
REPAIR CLAMP FOR BELL AND SPIGOT JOINTS
Filed May 9, 1939  3 Sheets-Sheet 3
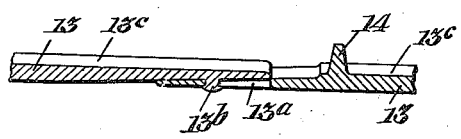
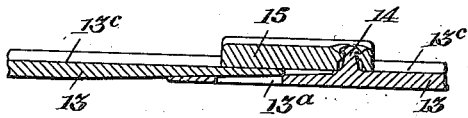
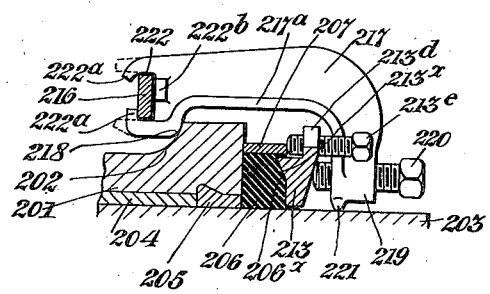
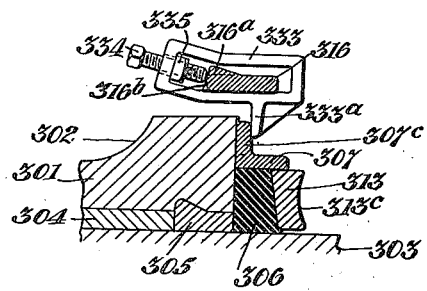
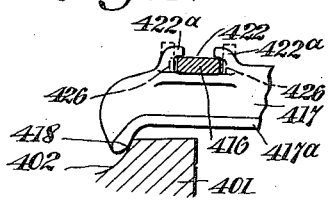
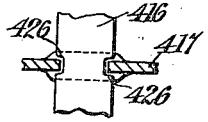
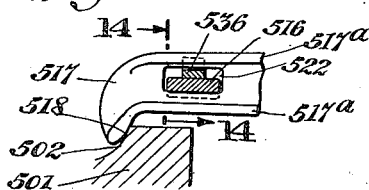
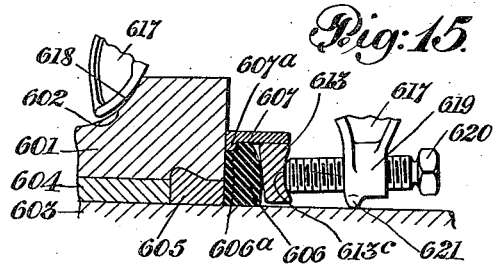
INVENTOR
Clifford P. Weber
BY
Louis Prevost Whitaker
ATTORNEY Patented Apr. 22, 1941

2,239,307

UNITED STATES PATENT OFFICE 2,239,307

REPAIR CLAMP FOR BELL AND SPIGOT JOINTS

Clifford P. Weber, Bradford, Pa., assignor to Dresser Manufacturing Company, Bradford, Pa., a corporation of Pennsylvania Application May 9, 1939, Serial No. 272,599

13 Claims. (Cl. 285—164)

My invention consists in the novel features hereinafter described, reference being had to the accompanying drawings which illustrate several embodiments of the invention, selected by me for purposes of illustration, and the said invention is fully disclosed in the following description and claims.

My invention is a repair clamp or leak clamp for bell and spigot joints in pipe lines. Bell and spigot joints are ordinarily connected by sealing means interposed between the spigot of one pipe section and the surrounding bell of the adjacent pipe section, the outer portion of which sealing means is usually lead or cement. Repair devices for bell and spigot joints in general use ordinarily comprise an annular packing ring surrounding the spigot and engaging the solid packing and a portion of the face of the bell, a clamping ring for compressing the packing, a separate bull ring or anchor ring for engaging the exterior of the bell mouth, and a series of through bolts and nuts for connecting the anchor ring and follower ring. As these repair clamps are usually placed in position in the field around the bell and spigot joints in a pipe line which is in use, the clamping ring and bull rings are necessarily made in sections to enable them to be placed in position by excavating around the particular joint to be repaired. There are, therefore of necessity, a considerable number of separate parts, including the desired number of bolts and nuts, all of which are assembled at the particular joint to be repaired.

One of the objects of my invention is to dispense with the bull ring, clamping ring and through bolts, and to provide clamping means for compressing the gasket, including an annular follower ring for directly engaging the gasket on the face opposite the bell face, a gasket retaining ring for surrounding the gasket to prevent cold flow between the follower ring and the bell face, and a clamping device comprising a tension ring for surrounding the exterior of the bell provided with a plurality of clamps disposed longitudinally of the pipe section and connected with the tension ring, each of said clamps being provided at one end with a projection to engage the scarf of the bell, and at the other end with an adjusting screw disposed substantially parallel to the outer surface of the spigot for forcing the follower toward the bell. The elimination of through bolts in tension is in itself an important advantage as the bolts in tension are highly susceptible to failure due to corrosion, whereas for any given diameter and material used a screw in compression, as used in the present invention is not nearly so susceptible to failure due to corrosion.

The tension ring is preferably formed in sections, for example, four sections in a ring twenty-four inches in diameter, and adjustment is provided at each joint in the ring. It is obviously desirable to provide adjustment at as many points as possible so that the deviation from a true circle may be minimized, in adjusting the ring to accommodate variations in the pipes. The sections of the ring are preferably detachably united at the factory, so that when assembling in the field, it is only necessary to disconnect the ring sections at two points for placing it around the bell after which the parts are reconnected and the sections adjusted as desired.

The follower and gasket retaining ring are also similarly formed in sections provided with means for adjustably connecting them to conform to variations in the outer diameter of the spigot and I also provide means for holding the gasket retaining ring firmly in contact with the bell face to prevent cold flow of portions of the gasket between it and the bell face.

My invention also comprises other novel features of construction and combination of parts, all of which are illustrated in the accompanying drawings, described in the specification, and particularly pointed out in the claims.

Referring to the accompanying drawings—

Fig. 2 is an elevation of a portion of the clamp, looking toward the bell face, the spigot being shown in section, and one of the clamps at the left of the figure being omitted for clearness.

Fig. 3 represents a section on line 3—3 of Fig. 2, looking in the direction of the arrows in that figure.

Fig. 4 is a sectional view, similar to Fig. 3, between the locator plates, the adjacent clamp being broken away.

Fig. 5 is a view similar to Fig. 4, showing a slight modification in which the locator plates are omitted and interengaging portions of the retaining ring and gasket hold the retaining ring against the face of the bell.

Fig. 6 is a view similar to Fig. 3, with a portion of the clamp broken away, showing a slight modification of the gasket retaining ring.

Fig. 7 is a view similar to Fig. 6, showing a modification of the form of the gasket and follower, and omitting the gasket retaining ring.

Fig. 8 is a sectional view through the follower, on the line 8—8 of Fig. 2, looking in the direction of the arrows.

Fig. 8a is a similar view showing one of the retaining ring locator plates attached to the adjacent portions of the follower.

Fig. 9 is a sectional view similar to Fig. 3, showing a slightly modified construction of the clamp-device and a modified form of follower provided with independent means for holding the gasket retainer in contact with the bell face.

Fig. 10 is a partial sectional view similar to Fig. 5, omitting the clamp and screw, and showing a modified form of retaining ring and independent means carried by the tension ring for holding it in contact with the bell face.

Fig. 11 is a detail sectional view showing a modified arrangement for connecting the clamps to the tension ring.

Fig. 12 is a plan view of the portions of the tension ring and clamp illustrated in Fig. 11.

Fig. 13 is a view similar to Fig. 11 showing another modified arrangement for connecting the clamps to the tension ring.

Fig. 14 is a detail sectional view on the line 14—14 of Fig. 13.

Fig. 15 is a sectional view similar to Fig. 5 showing a slightly modified form of gasket.

Figure 1:
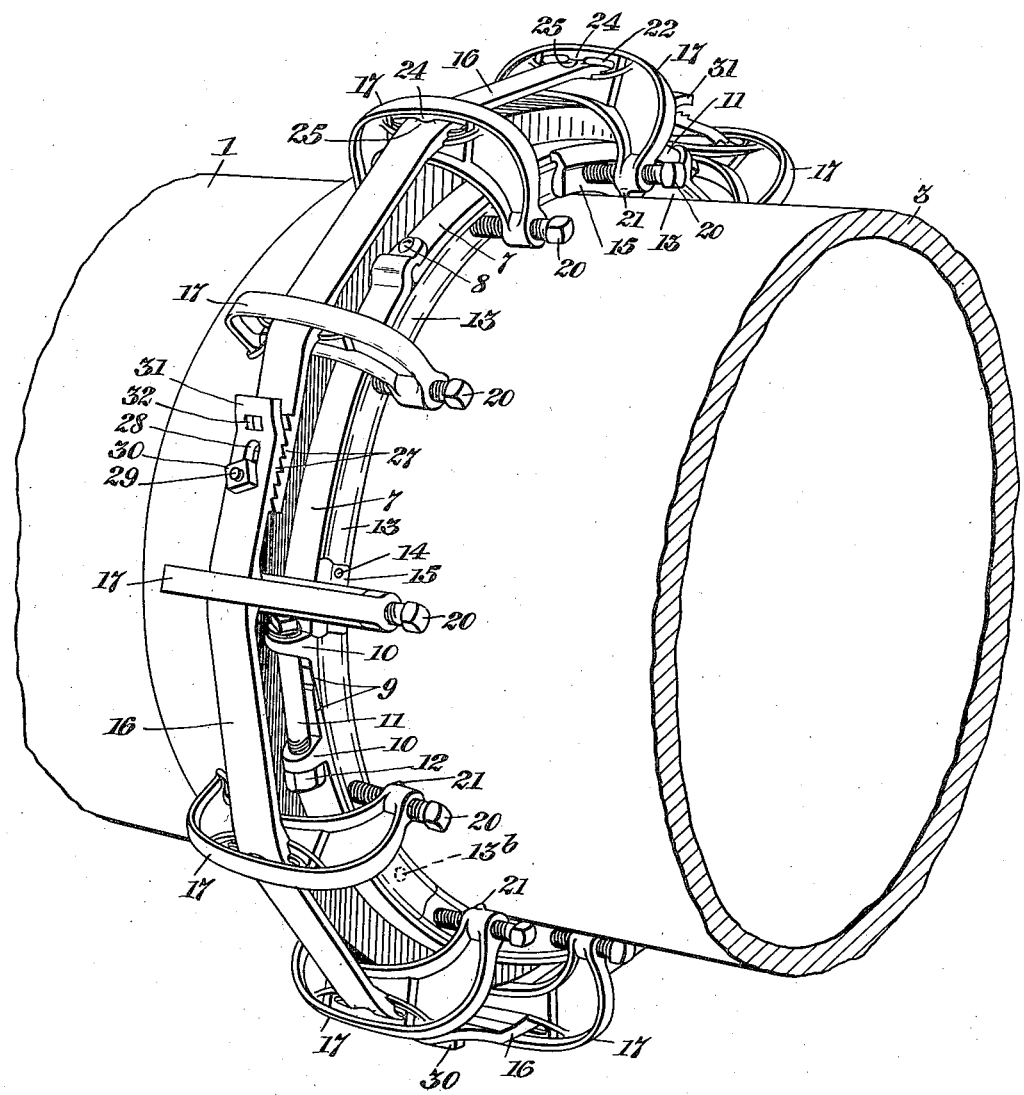
Fig. 1 is a perspective view of a bell and spigot joint, portions of the pipe sections being broken away and having my improved leak repair device in operative position thereon.

In the preferred form of my invention, which is illustrated in Figs. 1 to 4 inclusive, 1 represents the bell end of a pipe section provided with the usual scarf, indicated at 2. 3 represents the spigot portion of an adjacent pipe section connected with the bell and sealed by suitable packing in any usual or preferred manner. In this instance the space between the spigot end and the inner surface of the bell is filled with a fibrous material such as hemp or the like, indicated at 4, and a solid packing 5, such as cement or lead, as best indicated in Fig. 3.

Assuming such a joint to leak and require the application of my improved leak repair clamp, 6 represents the annular packing ring or gasket which may be of any desired cross section, and is preferably composed of rubber or rubber composition. In this instance it is shown as substantially trapezoidal, but in some instances I find it desirable to make the outer face of the gasket which engages the follower convex, or in other words, outwardly curved between the inner and outer faces of the gasket, as shown in Fig. 15 and hereinafter referred to. This gasket will of course be cut to enable it to be placed around the spigot.

Surrounding the gasket is a gasket retaining ring, indicated at 7, to confine the gasket and prevent the escape of portions thereof due to cold flow or other causes, and also to prevent the gasket from being attacked by harmful materials in the surrounding soil. This retaining ring is preferably formed in a plurality of sections which are bolted or otherwise secured in place around the gasket and the follower, hereinafter described. If cast material is used for the retaining ring, it is found desirable to make the ring, especially if of a large diameter of relatively short segments, and loosely rivet two or more of these segments together, as indicated at 8, to form larger sections. Such short pieces may be more readily cast to correct form and size than longer pieces and may also be more readily molded. An additional advantage of making the retaining ring in short segments loosely riveted together, is that the short segments can pivot with respect to each other to accommodate variations of the bell face from a true plane. This is very important for insuring an intimate contact of the retaining ring with the face of the bell since, as a matter of fact, the large majority of bell faces contain variations considerably out of a single plane.

The retainer ring sections, of which there may be as many as are desired according to the size of the ring, are provided with overlapping ends, indicated at 9, 9 in Fig. 2, preferably tapered so that they may slide over each other without producing any material offset on their inner faces, such slight offset as may occur being readily filled by portions of the gasket when subjected to pressure. The overlapping portions 9, 9 of the retainer ring sections are provided, in the form shown in Fig. 2, with apertured lugs 10, 10 to receive a connecting screw or bolt 11, provided with a nut 12, so that the ring 7 can be drawn into firm engagement with the rubber gasket 6. In lieu of the lugs and connecting bolts any other suitable construction may be employed, as for example, the toothed or ratchet construction shown in connection with the tension ring in Fig. 2, for example.

The inner edge of the gasket retaining ring 7, may in some instances be provided with an inwardly extending annular flange, indicated at 7a, which engages an annular recess 6a in the gasket, as indicated, for example, in Fig. 5, so that when the gasket is compressed by the follower 13, hereinafter referred to, it will force the inner edge of the retaining ring into firm engagement with the bell face and hold it in contact with the bell face throughout its entire extent. The interengaging portions 6a and 7a of the gasket and retaining ring may be employed for this purpose either with or without additional means hereinafter described, which may be employed to hold the retaining ring against the bell face.

The follower ring is likewise made in a plurality of segments, one end of each having a tapered portion provided with a slot 13a, the other end being provided with a tapered portion covering said slot and having a stud or projection, 13b, as shown for example in Figs. 8 and 8a. All but one of the projections 13b may be loosely riveted over in the factory, forming hinge joints which simplify the placing of the follower around the spigot in the field in assembling the clamp, while the slots 13a provide for the adjustment of the follower to a close fit to accommodate variations in the exterior diameter of the spigot. One of these joints can be left open to permit the follower to be placed around the spigot, the projection 13b at that point being ground off so that the slot in the adjacent segment may be readily snapped over it. There is no tendency for the follower to come apart at this point. The retainer ring will hold the follower in adjusted position and the clamping screws hereinafter described will prevent the follower from separating at the unriveted point.

The outer face of the follower 13 is provided with outwardly extending studs 14, one of which is conveniently located adjacent to each of the joints of the follower, and in the larger sizes additional studs 14 may be located between the joints if desired. These studs are for the purpose of holding in place what I term retainer ring locator plates 15, shown in Figs. 1 and 2, and in section in Figs. 3, 4, 6 and 8a. The outer face of the follower ring is preferably inwardly curved or concave from the outer to the inner edge as indicated at 13c.

The retainer ring locator plates are each provided at one end with an aperture to engage one of the studs 14 projecting from the outer face of the follower, and will be preferably placed in position over the tapered meeting ends of adjacent sections of the follower, as indicated at 8a, after which the stud 14 will be upset or riveted so as to hold the locator plate 15 in place, while permitting it to rock with respect to the follower. As shown in Figs. 3 and 6, for example, these locator plates have their inner faces convex, but of a different radius than the concave outer face of the follower, in such manner that the locator plates and the follower may contact adjacent to their inner edges so that when pressure is applied to the outer face of the locator plates by means of the clamp screws, as hereinafter described and as shown in Fig. 3, for example, there will be a turning movement of the locator plate whereby its outer edge will tend to move inwardly toward the bell face. The outer edges of the locator plates 15 are provided with inwardly extending flanges 15a which engage the outer edge of the gasket retaining ring 7, the construction being such that a small portion of the force of the clamping screw will be exerted against the retaining ring to hold it in contact with the bell face while the larger portion will be exerted against the follower to effect compression of the gasket. In order to insure that a major portion of the force of the screw is exerted against the follower to compress the gasket, it is essential that the contact between locator plate and follower be closer to the contact between rocker plate and screw than the contact between locator plate and retainer ring. However, it is likewise absolutely essential that the contact between rocker plate and follower be not in line with the axis of the screw since in this case there would be no turning moment to cause the locator plate to rock, so that when the retainer ring is seated against the bell there would be no further compression of the gasket. Obviously, if the contact between the locator plate and follower were radially outward from the axis of the screw, the turning moment would be in a direction to rotate the rocker away from the retainer ring, thus defeating its primary object. The locator plates are also provided with outwardly projecting shoulders, indicated at 15b, to prevent the clamp screw from sliding upwardly, which function will of course be also provided by the curved outward face of the follower where the screw directly engages the follower as indicated for example in Fig. 5. In some cases it will be sufficient to provide the locator plates 15 at the principal joints in the follower ring, but they may also be employed at any desired intervals between such joints as may be desired and at such points the studs 14 will be provided to receive them.

16 represents a tension ring which may be of circular or polygonal form and to which the separate clamps, indicated at 17 are conveniently attached. The tension ring may be formed in one piece with its ends overlapped, or may be formed in short pieces riveted together to form longer sections, connected by suitable adjusting means in like manner to the retainer ring. This tension ring will obviously be of such strength as to resist any outward movement of the clamps 17 when the compression screws are tightened up. Each of the clamps 17 is provided at one end with an anchoring projection 18 for engaging the scarf of the bell, and at the other end with an interiorly threaded boss 19 to receive a horizontally disposed screw 20. The boss 19 is provided with a sufficient thickness of metal on its outer face which may be in the form of a lug 21 to form a stop to hold the clamp in such position that the head of the screw 20 will not approach the spigot so closely as to prevent its being turned by means of the polygonal head with which said screw is provided.

Each of the clamps 17 comprises a web portion reinforced by inner and outer horizontal flanges 17a and 17a. The central portion of each of these clamps is thickened between the beveled portions indicated at 17b and 17b, and provided with a horizontally disposed aperture 22, having a centrally disposed portion, indicated at 23, of substantially the same width as the tension ring 16. The lower edge of this aperture is further reinforced by means of the opposite flanges 17c. The upper edge of this aperture 22 is provided with an inwardly extending centrally located boss or projection 24 and the outer face of the tension ring is provided at the desired intervals where these clamps are to be attached with an outwardly extending similar boss, indicated at 25. When the clamps are originally formed, and they are preferably made of malleable cast iron, the outer face follows the form indicated in the dotted line in Fig. 3, the upper edge of the aperture 22 being slightly arched so as to permit the insertion of the tension ring therethrough, and the movement of the clamp thereon to its proper position. The inner face of the tension ring is also provided at the same intervals with transversely disposed recesses, indicated at 26 in dotted lines in Fig. 2, to receive the lower edge of the aperture 23 and the flanges 17c on opposite sides thereof. When the clamp has been properly positioned on the tension ring, the outer surface is depressed by hammering or otherwise, so as to bring the projection 24 sufficiently close to the projection 25 on the tension ring to prevent the possibility of the clamp moving longitudinally of the ring. At the same time the connection between the clamps and the tension ring is not a rigid one and a sufficient play is provided between the sides of the recesses 23 and the lateral portions of the tension ring to permit a swiveling action of the clamps as will be readily understood to accommodate such variations in the surfaces of the bell and spigot engaged by the clamps as may be found to exist. The clamp can rotate about a radial axis and also about a circumferential axis. But, in addition, if the lugs 18, come into contact with the scarf of the bell before the projections 21 engage the spigot, the clamp will rotate about the lug 18 until the projection 21 does contact the spigot. And vice versa if the projection 21 contacts the spigot before the lugs 18 are in engagement with the bell, the clamp will rotate about the projections 21 until the lugs 18 do firmly engage the bell. The meeting ends of the sections of the tension ring overlap, as shown in Figs. 1 and 2, and their adjacent faces are provided with oppositely disposed teeth, indicated at 27, 27. One of the overlapping parts is also slotted, as indicated at 28 see Fig. 1, and the parts are connected by a bolt 29 and nut 30, as clearly shown in Figs. 1 and 2. For convenience of assembling the parts and fitting the clamps and tension ring around the bell, I find it convenient to provide the exterior overlapping part of the tension ring with an upwardly extending portion 31, provided with an aperture 32, through which a screw driver or other tool may be inserted and made to engage one of the teeth 27 of the underlying part, and the two parts being loosely connected by the bolt 29 and nut 30. Such tool can be used in this manner to tighten the tension ring so as to bring the opposite ends of the clamps 17 in engagement respectively with the scarf of the bell and the exterior of the spigot, after which the nut 30 can be turned up to secure the parts in this relation.

The set screws or clamping screws 20 are then turned up. These screws will directly engage the exterior concave or curved outer face of the follower 13, as indicated in Fig. 4, in case the locator plates are not used, or between the locator plates where the latter are employed. At the points where the retainer ring locator plates 15 are located, the screws will engage the latter within the shouldered portion 15b thereof. As the screws are turned up, it will be seen, especially by reference to Fig. 3, that the gasket will be placed under heavy pressure, forcing its inner peripheral face into sealing engagement with the spigot and its perpendicular face into sealing engagement with the solid packing 5 and the inner face of the bell, the retaining ring 7 preventing the outward expansion of the gasket and being itself held firmly against the face of the bell so as to prevent any cold flow adjacent thereto, by the flange 15a on the locator plates 15. While there will of necessity be some very slight clearance between the inner peripheral face of the follower and the spigot at some points around the spigot the outer peripheral face of the follower and the inner face of the retaining ring 7, can be maintained in such close substantial contact that no appreciable cold flow can occur at the outer face of the gasket.

In some instances as shown in Fig. 15, in which the parts corresponding to those shown for example in Figs. 1, 2 and 3 are given the same reference numerals with the addition of 600, I prefer to employ a gasket, the outer annular surface of which is outwardly curved from the outer to the inner peripheral surface of the gasket, or in other words, is convex. This convex annular portion of the gasket is opposite the inner plain annular face of the follower. This provides annular spaces at the inner and outer edges of the follower so that when the clamping screws are tightened, the pressure of the follower is applied to the gasket along a line on its outer face midway between the inner and outer peripheral surfaces, and the convex face of the gasket is gradually flattened until the entire body of the gasket is placed under a condition of high internal tension and the gasket is distorted so that it completely fills the space within the follower and retaining ring. This avoids any objection of bringing the gasket to the desired high internal stress necessary to produce the required sealing effect by a relatively small amount of rotation of the clamping screws in which case a slight shifting of the clamp or any other accidental disturbance of the joint tending to disturb the screws might in some cases loosen one or more of the screws sufficiently to cause a leak. By using the convex outer faced gasket as indicated in Fig. 15, a considerably larger inward movement of the screws is required, that is to say, a considerably larger number of rotations of the screws is required to produce the internal stress of the gasket and consequently, a slight disturbance of the screws will not materially affect the internal stress and sealing effect of the gasket.

It will be understood that all the parts of the clamping device, to wit, the retaining ring and clamps, will ordinarily be assembled at the factory and may readily be placed around the joint, as will also the retaining ring and follower, so that there are no loose parts or bolts and nuts to be accounted for and assembled in the field, and my improved clamp can therefore be very quickly applied to a leaking joint and tightened up to seal the same in the field.

In some instances, as indicated for example in Fig. 6, the retaining ring may be provided at its outer edge with an inwardly extending bead, indicated at 7b, in that figure. This bead will ordinarily engage the outer face of the follower, and at the overlapping portions the inner overlapping portion will have the bead cut away and will be laterally tapered so that the bead on the outer end of the overlapping portions may be continued and close the gap between the retaining ring and follower at the point where the inner end of the overlapping portions terminate. Where the retaining ring 7 is provided with the bead 7b it may or may not be provided with the downwardly extending flange 7a at the inner edge next to the face of the bell, and the locator plates may or may not be employed as desired. Both are shown in Fig. 6.

In Fig. 7 I have shown a slight modification of the follower and gasket disclosed in Figs. 1 to 6, 8 and 8a, the parts corresponding to those previously described being given the same reference numerals with the addition of 100 to avoid repetition. In this construction the gasket, which is indicated at 106 has an exterior inclined face 106x connecting the exterior vertical face with the exterior narrow cylindrical face 106y. The retaining ring is omitted and the follower 113 is provided with an inclined annular flange portion 113x extending upwardly and in a direction toward the face of the bell and terminating closely adjacent thereto, leaving only a sufficient space to permit of the movement of the follower toward the bell face to apply the desired pressure to the gasket. The exterior of the follower is provided at suitable intervals with bosses, one of which is indicated at 113z, preferably having concave outer faces 113c, these bosses being located in proper position to be engaged by the compression screws 120 for the purpose of applying the desired pressure to the gasket in the manner previously described. The other parts of the clamp are constructed substantially as hereinbefore set forth.

In Fig. 9 I have shown a slightly modified form of the clamping device, in which the parts corresponding to those previously described with respect to Figs. 1 to 6, 8 and 8a, are given the same reference numerals with the addition of 200. Thus, 216 represents the tension ring, which in this instance has its greatest width in a plane perpendicular to the axis of the bell, it being formed in sections and united at one or more points adjustably, in the manner previously described, or any other desired way. The individual clamps 217 comprise in this instance a vertical web provided throughout its lower edge with oppositely disposed reinforcing flanges 217a, one of which is shown in Fig. 9 and having at one end the anchor projection 218, and at the opposite end, a boss 219 provided with the stop projection 221, and carrying the compressing screw 220. The end of the clamp adjacent to the retaining ring is provided with a recess 222, the upper and lower edges of which extend loosely into notches or recesses in the tension ring, as indicated in dotted lines and their projecting ends 222a are adapted to be bent over to prevent the separation of the clamps from the tension ring, while holding them loosely in engagement therewith. The web portion of the clamp adjacent to the recess 222 is provided on opposite sides with outwardly extending lugs 222b, one of which is shown in Fig. 9, to engage the adjacent face of the tension ring and limit the angular movement of the clamp with respect to the tension ring.

In this instance the gasket 206 is shown provided with an inclined face 206x extending in a direction toward the face of the bell to be engaged by a similarly inclined face 213x on the follower 213, so as to produce a tendency to force the gasket in a direction toward the face of the bell and the exterior of the spigot, and the outer face of the follower is inclined upwardly and away from the face of the bell in the form shown in Fig. 9. In this figure the retaining ring 207 is shown as a plain ring surrounding the gasket and having its ends connected in any suitable manner. In this figure, also, the follower is provided at suitable intervals with an outwardly extending projection 213d, each containing a threaded aperture to receive an auxiliary set screw 213e to engage the exterior edge of the retaining ring and force it into firm engagement with the face of the bell. Obviously the set screws 213e would be turned up after the compression screws 220 had been turned up to the desired extent.

In Fig. 10, in which the parts corresponding with those shown in Figs. 1 to 6, 8 and 8a, are given the same reference characters with the addition of 300, I have shown a modified construction for holding the gasket retaining ring against the bell face independently of the compression screws 320. The clamp is not shown in Fig. 10, but is to be understood to be similar to that shown in Fig. 3.

In this figure the gasket retaining ring 307 is provided at its inner edge with outwardly extending portions 307c, preferably in the form of an annular flange, which engages the face of the bell as shown. The tension ring 316 is provided with a plurality of clips 333 loosely surrounding the tension ring and located at intervals around the same between adjacent clamps. Each of these clips is provided with an inwardly extending projection 333a for engaging the outer face of the flange 307c of the retaining ring, and each clip is also provided with a set screw 334 passing through an unthreaded aperture in the clip and through a nut 335 and engaging one edge of the tension ring 316. This avoids the necessity of tapping the aperture in the clip. In order to facilitate access to the heads of the screws 334, I prefer to have the end portions of the clips adjacent to the bell mouth inclined outwardly therefrom, as shown, but this is not essential. It is also found desirable where these clips are used to provide the tension ring with an outwardly extending bead 316a to increase the vertical width of the lateral edge of the tension ring which is engaged by the screw and there the clips are bent outwardly at their ends adjacent to the screws 334 the adjacent edge 316b of the tension ring is preferably inclined so as to be perpendicular to the screws 334. By this means the retaining ring can be firmly held against the face of the bell independently of the compression screws which engage the follower 313. The locator plates indicated at 15 in Fig. 3, for example, and hereinbefore described, may be omitted.

In Figs. 11 and 12 I have shown a slightly different arrangement for uniting the clamps to the retaining ring, in which figures the parts are given the same reference numerals as in Figs. 1 to 6, 8 and 8a with the addition of 400 to avoid repetition. As shown in these figures, each of the clamps, one of which is partially indicated at 417 is provided with an open recess 422 in its outer edge instead of a closed aperture, and the lateral walls of the recess are extended outwardly to form projections 422a in a manner similar to that indicated in Fig. 9. The tension ring 416 is provided with lateral recesses 426 to loosely interlock with the respective clamps and prevent them from moving longitudinally of the tension ring, and after the clamps are placed in engagement with the tension ring, the projections 422a may be hammered or bent over the outer surface of the tension ring in order to prevent the disengagement of the interlocking portions of the clamps and tension ring.

In Figs. 13 and 14 I have shown a still different method of connecting the clamps to the tension ring, and in these figures the parts corresponding to those in Figs. 1 to 6, 8 and 8a, are given the same reference characters with the addition of 500. A portion of one of the clamps is illustrated at 517 in these figures and is shown provided with an aperture 522 to loosely engage the tension ring 516, which in this instance is provided at its inner face with transversely extending recesses indicated at 526 to loosely engage the webs of the clamps, to prevent the movement of the clamps longitudinally of the tension ring. The apertures 522 are of greater width than the thickness of the tension ring, as shown, to permit the passage of the tension ring through the same, and the location of the clamps with respect thereto, after which a short bendable strip or plate, indicated at 536 may be passed through the aperture 522, the ends being bent upwardly as shown at 536a which will prevent the accidental disengagement of the interlocking parts of the clamps and tension ring.

It will be understood that in all of the embodiments of my invention the clamps will be interlocked with the tension ring, but will be assembled thereon so as to prevent their longitudinal displacement with respect to the ring, while each clamp will have a slightly loose connection with the tension ring, which will permit it to assume positions slightly angular to a perpendicular relation, to accommodate irregularities in the pipe sections, and the clamps will likewise be capable of slight movement toward and from the spigot. It will also be understood that in all these embodiments the tension ring itself, whether made in one piece or composed of sections united together, may be adjusted to accommodate variations in the diameter of the bell and irregularities in its exterior surface. While I prefer to use the arrangement shown in Fig. 2 for connecting the adjacent ends of the tension ring, it is obvious that they may be drawn together by means of bolts and lugs in a manner similar to that shown in Fig. 2 in connection with the retaining ring, or they might be drawn together by turn buckles or other suitable means if desired.

There are distinct advantages in the use of a plurality of independent anchor clamps held in position by a separately formed tension ring, as herein shown and described. The use of the relatively small and simple castings or forgings forming the independent clamps materially simplify the manufacture of the clamping device as compared with a solid continuous clamping ring or bull ring formed in sections and united around the joint. Furthermore, the loosely supported anchor clamps enable them to accommodate variations and irregularities in diameter in the bell which could not well be accommodated by continuous clamping rings, while at the same time the individual clamps also accommodate any such variations or irregularities in the construction of the pipe sections so as to produce the most efficient application of pressure to the gaskets. It will also be understood that in addition to the slight looseness in the connections between the individual clamps and the tension ring, portions of the ring itself can yield slightly one way or the other under torsional or bending stress applied by the clamps to further enable them to accommodate themselves to any unusual formation of the pipe sections.

It will also be noted that the circle of the compression screws will always be in exact circular alignment with the follower independently of any variations in the diameter of the tension ring, due to adjustments thereof, whereas obviously any adjustment in a solid sectional clamping ring would change the position of the bolts with respect to the spigot and follower.

These factors are in addition to the distinct advantage of being able to assemble all of the parts of the clamping device at the factory, including the compression screws, so as to obviate the necessity of keeping track of and assembling a large number of small parts in applying the clamp to the joint.

What I claim and desire to secure by Letters Patent is:

1. In a repair clamp for bell and spigot pipe joints, the combination with a gasket and follower, of a clamping device comprising a tension ring of greater diameter than the greatest exterior diameter of the bell, and a plurality of separate clamps operatively connected therewith, each provided at one end with an anchoring projection for engaging the scarf of the bell, and adjacent to the other end with a compression screw for engaging the follower.

2. In a repair clamp, the combination with a gasket and follower, of a clamping device comprising a tension ring, and a plurality of separate clamps operatively connected therewith, each provided with an anchoring projection and a threaded adjustable pressure applying means for engaging the follower, said tension ring and clamps being provided with interengaging means for preventing the movement of said clamps longitudinally of said ring.

3. In a repair clamp, the combination with a gasket and follower, of a clamping device comprising a tension ring, and a plurality of separate clamps operatively connected therewith, each provided with an anchoring projection and a threaded adjustable pressure applying means for engaging the follower, said tension ring and clamps having interlocking means loosely engaging each other, for securing the clamps to said ring and holding them against movement longitudinally thereof while permitting slight movements of the clamps angularly with respect to said ring.

4. In a repair clamp, the combination with a gasket and follower, of a clamping device comprising a tension ring, and a plurality of separate clamps operatively connected therewith, each provided with an anchoring projection and a threaded adjustable pressure applying means for engaging the follower, said clamps being each provided with an aperture for the passage of the tension ring therethrough and said clamps and tension ring having interlocking portions to hold the clamps against movement longitudinally of the tension ring, portions of the clamps adjacent to said apertures therein being yieldable to permit the apertures to be partially closed to prevent the disengagement of the said interlocking portions.

5. In a repair clamp, the combination with a gasket and follower, of a clamping device comprising a tension ring, and a plurality of separate clamps operatively connected therewith, each provided with an anchoring projection and a threaded adjustable pressure applying means for engaging the follower, said clamps being each provided with an aperture for loosely engaging the tension ring, one side of which is yieldable, and provided with an inwardly extending projection located substantially centrally of the length of said aperture, and the portions of said tension ring passing through the clamps being provided with recesses on the inner face to interlock with one edge of the apertures in said clamps to prevent movement thereof longitudinally of the tension ring, and projections located centrally of the width of said tension ring located coaxially with the inwardly extending projections of the respective clamps, whereby the said yieldable portions of the clamps may be forced inwardly to prevent the accidental disengagement of the said interlocking portions of the clamps and tension ring.

6. In a repair clamp for bell and spigot pipe joints, the combination with a gasket and follower, of a clamping device comprising a tension ring of greater diameter than the greatest exterior of the bell, and a plurality of separate clamps operatively connected therewith, each provided at one end with an anchoring projection for engaging the scarf of the bell, and adjacent to the other end with a compression screw for engaging the follower, a retaining ring for surrounding the gasket, and locator plates between certain of the compression screws and the follower, and provided with portions for engaging the outer edge of said retaining ring and transmitting a portion of the pressure of said screws to the retaining ring to force its inner edge against the face of the bell.

7. In a repair clamp for bell and spigot pipe joints, the combination with a gasket and a follower, of a clamping device comprising a tension ring of greater diameter than the greatest exterior diameter of the bell, and a plurality of separate clamps operatively connected therewith, each provided at one end with an anchoring projection for engaging the scarf of the bell, and adjacent to the other end with a compression screw for engaging the follower, a retaining ring for surrounding the gasket, and rocking locator plates interposed between certain of the compression screws and the follower and provided with portions having a rocking engagement with the follower, and provided with portions for engaging the outer edge of said retaining ring and transmitting a portion of the pressure of said screws to the retaining ring to force its inner edge against the face of the bell.

8. In a repair clamp for bell and spigot pipe joints, the combination with a gasket and follower, of a clamping device comprising a tension ring of greater diameter than the greatest exterior diameter of the bell, and a plurality of separate clamps operatively connected therewith, each provided at one end with an anchoring projection for engaging the scarf of the bell, and adjacent to the other end with a compression screw for engaging the follower, the follower having its exterior face concave to receive the ends of certain of said screws, a retaining ring for surrounding the gasket, and locator plates located between other of the compression screws and the follower and having their inner faces convex but of a different radius from the concave faces of the follower, said locator plates having a rocking engagement with the concave face of the follower and provided with portions at its outer edge for engaging the outer edge of the retaining ring, and transmitting a portion of the pressure of said screws to the retaining ring to force its inner edge against the face of the bell.

9. In a repair clamp for bell and spigot pipe joints, the combination with a gasket and follower, of a clamping device comprising a tension ring of greater diameter than the greatest exterior diameter of the bell, and a plurality of separate clamps operatively connected therewith, each provided at one end with an anchoring projection for engaging the scarf of the bell, and adjacent to the other end with a compression screw for engaging the follower, the said gasket being provided with an annular recess in its outer face adjacent to the perpendicular face which engages the bell, a retaining ring for surrounding the gasket having its inner edge provided with an inwardly extending annular flange to engage the recess in the gasket.

10. In a repair clamp, the combination with a gasket and follower, of a clamping device comprising a tension ring, and a plurality of separate clamps operatively connected therewith, each provided with an anchoring projection and a threaded adjustable pressure applying means for engaging the follower, a retaining ring surrounding the gasket, and independent screws carried by the follower and engaging the outer edge of the retaining ring for forcing it into contact with the face of the bell.

11. In a repair clamp, the combination with a gasket and follower, of a clamping device comprising a tension ring, and a plurality of separate clamps operatively connected therewith, each provided with an anchoring projection and a threaded adjustable pressure applying means for engaging the follower, a retaining ring surrounding the gasket, the follower being provided at intervals with outward projections having threaded apertures therein, and set screws extending through said threaded apertures and engaging the outer edge of said retaining ring to force it into contact with the face of the bell.

12. In a repair clamp, the combination with a gasket and follower, of a clamping device comprising a tension ring, and a plurality of separate calmps operatively connected therewith, each provided with an anchoring projection and a threaded adjustable pressure applying means for engaging the follower, a retaining ring for surrounding the gasket, provided at its inner edge with an outwardly extending flange, clips engaging the tension ring intermediate certain adjacent clamps and provided with inwardly extending projections for engaging the outwardly extending flange of the retaining ring, and further provided with screws for engaging an edge of the tension ring, to thereby force the retaining ring against the face of the bell.

13. In a repair clamp for bell and spigot pipe joints, the combination with a gasket and follower, of a clamping device comprising a tension ring of greater diameter than the greatest exterior diameter of the bell, and a plurality of separate clamps operatively connected therewith, each provided at one end with an anchoring projection for engaging the scarf of the bell, and adjacent to the other end with a compression screw, and a retaining ring for surrounding the gasket, said compression screws transmitting pressure to the retaining ring at intervals around the clamp and in a direction toward the face of the bell.

CLIFFORD P. WEBER.